United States Patent
Welland et al.

(10) Patent No.: US 7,376,396 B2
(45) Date of Patent: May 20, 2008

(54) RATIOMETRIC TRANSMIT PATH ARCHITECTURE FOR COMMUNICATION SYSTEMS

(75) Inventors: David R. Welland, Austin, TX (US); Caiyi Wang, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 438 days.

(21) Appl. No.: 11/096,133

(22) Filed: Mar. 31, 2005

(65) Prior Publication Data

US 2006/0003706 A1    Jan. 5, 2006

Related U.S. Application Data

(63) Continuation-in-part of application No. 10/880,483, filed on Jun. 30, 2004, now Pat. No. 7,272,373.

(60) Provisional application No. 60/619,345, filed on Oct. 15, 2004.

(51) Int. Cl.
*H04B 1/40* (2006.01)
*H03C 1/52* (2006.01)

(52) U.S. Cl. .................. 455/76; 455/87; 455/108

(58) Field of Classification Search ............... 455/76, 455/87, 118, 108
See application file for complete search history.

(56) References Cited

U.S. PATENT DOCUMENTS

| | | | |
|---|---|---|---|
| 3,931,578 A | 1/1976 | Gittinger | 325/461 |
| 4,484,221 A | 11/1984 | Tults | 358/191.1 |
| 5,574,985 A * | 11/1996 | Ylikotila | 455/76 |
| 5,610,559 A | 3/1997 | Dent | 331/2 |
| 5,734,970 A * | 3/1998 | Saito | 455/76 |
| 5,890,051 A * | 3/1999 | Schlang et al. | 455/76 |
| 5,983,088 A | 11/1999 | Aschwanden | 455/188.2 |
| 6,181,212 B1 | 1/2001 | Khoini-Poorfad et al. | 331/16 |
| 6,205,183 B1 | 3/2001 | Dent | 375/261 |
| 6,225,926 B1 | 5/2001 | Hayase | 341/110 |
| 6,256,511 B1 * | 7/2001 | Brown et al. | 455/552.1 |
| 6,370,368 B1 | 4/2002 | Kianusch | 455/264 |
| 6,405,022 B1 * | 6/2002 | Roberts et al. | 455/76 |
| 6,526,265 B1 * | 2/2003 | Damgaard et al. | 455/118 |
| 6,868,261 B2 * | 3/2005 | Shi et al. | 455/114.2 |
| 6,961,547 B2 * | 11/2005 | Rozenblit et al. | 455/118 |
| 7,098,754 B2 * | 8/2006 | Humphreys et al. | 332/103 |
| 7,106,805 B2 * | 9/2006 | Atkinson et al. | 375/295 |

(Continued)

FOREIGN PATENT DOCUMENTS

EP    1432195 A1    6/2004

(Continued)

OTHER PUBLICATIONS

PCT International Search Report; PCT/US2005/022414; Jun. 23, 2005.

*Primary Examiner*—Duc M Nguyen
(74) *Attorney, Agent, or Firm*—O'Keefe, Egan, Peterman & Enders, LLP

(57) ABSTRACT

A ratiometric transmit path architecture for communication systems and related methods are disclosed. This ratiometric transmit path architecture utilizes a single local oscillator signal and dividers to provide mixing signals for intermediate frequency (IF) mixing circuitry and feedback mixing circuitry, thereby eliminating the need for separate IF and radio frequency (RF) voltage controlled oscillators (VCOs) in prior solutions.

22 Claims, 6 Drawing Sheets

U.S. PATENT DOCUMENTS

| | | | |
|---|---|---|---|
| 2001/0041532 A1 | 11/2001 | Tomasz et al. | 455/3.02 |
| 2002/0164965 A1 | 11/2002 | Chominski et al. | 455/118 |
| 2003/0011861 A1 | 1/2003 | Casagrande | 359/200 |
| 2004/0005869 A1 | 1/2004 | See et al. | 455/102 |
| 2004/0082305 A1 | 4/2004 | Kirschenmann et al. | 455/232.1 |

FOREIGN PATENT DOCUMENTS

| | | |
|---|---|---|
| WO | 98/21819 | 5/1998 |
| WO | 01/39364 A1 | 5/2001 |
| WO | 03/032514 A2 | 4/2003 |

* cited by examiner

RATIOMETRIC TRANSMIT PATH ARCHITECTURE FOR COMMUNICATION SYSTEMS

RELATED APPLICATIONS

This application is a continuation-in-part application of the following application: application Ser. No. 10/880,483 filed on Jun. 30, 2004, and entitled "RATIOMETRIC CLOCK SYSTEMS FOR INTEGRATED RECEIVERS AND ASSOCIATED METHODS," now U.S. Patent No. 7,272,373, which is hereby expressly incorporated by reference in its entirety. This application also claims priority to co-pending provisional application: Provisional Application Ser. No. 60/619,345 filed Oct. 15, 2004, and entitled "RATIOMETRIC TRANSMIT PATH ARCHITECTURE FOR COMMUNICATION SYSTEMS," which is hereby expressly incorporated by reference in its entirety. This Application is also related to concurrently filed application Ser. No. 11/096,134 entitled "WEIGHTED MIXING CIRCUITRY FOR QUADRATURE PROCESSING IN COMMUNICATION SYSTEMS."

TECHNICAL FIELD OF THE INVENTION

This invention relates to transmit path architecture for communication systems and, more particularly, to transmit path circuitry for wireless communication chip sets.

BACKGROUND

Radio frequency (RF) communication systems are used in a wide variety of applications such as television, cellular telephones, pagers, global positioning system (GPS) receivers, cable modems, cordless phones, radios and other devices that receive RF signals. RF receivers typically require frequency translation or mixing. Two-way wireless communication systems include receive path circuitry and transmit path circuitry. In prior solutions, this circuitry has been integrated into a plurality of integrated circuits and included within the system as a wireless communication chip set. With respect to the transmit path circuitry for such systems, intermediate frequency (IF) architectures have been used, where the baseband signal from a digital signal processor (DSP) is first converted to IF and then transmitted within the frequency band of the wireless communication network using offset phase lock loop (offset PLL) circuitry. With respect to cellular phone wireless communication networks, for example, the frequency bands can be around 850 MHz and 900 MHz for GSM cell phone networks, 1800 MHz for DCS cell phone networks, and 1900 MHz for PCS cell phone networks. Channel spacing in these cell phone networks is 200 kHz.

FIG. 2 (prior art) is a block diagram of an example architecture 200 for transmit path circuitry including an IF voltage controlled oscillator (VCO) 202, a transmit (TX) VCO 128 and an RF VCO 204. When the device is transmitting, I and Q baseband signals 107 are received from a digital signal processor (DSP) by the IF mix circuitry 220. The IF mix circuitry utilizes the IF VCO 202 to convert the I and Q signals to IF. The output 112 of IF mix circuitry 220 then goes to offset loop feed-forward circuitry 122. This offset loop feed-forward circuitry 122 will compare the phases of the signal 112 from the IF mix circuitry 220 with a signal 114 from the feedback mix circuitry 224. The offset loop feed-forward circuitry 122 will then use the phase difference between these signals to tune the TX VCO 128 to produce an output signal (OUTPUT) 105 at a desired frequency of a transmit channel within the frequency band for the communication network. The feedback mix circuitry 224 receives the output signal 105 and mixes the frequency down using the RF VCO 204 and a channel signal (CHANNEL) 127. The output signal 114 is then provided as feedback to the offset loop feed-forward circuitry 122. One problem with this prior architecture, where integration of the transmit path circuitry is attempted, is interference among the IF VCO 202, the TX VCO 128 and the RF VCO 204. In particular, spurs caused by the IF VCO 202 can be problematic and can significantly degrade performance, particularly when they fall within receive bands for GSM cellular communication networks.

One prior solution to this IF VCO 202 interference problem was to adjust the IF for certain troublesome receive channels. In other words, for a first set of transmit channels, the IF VCO 202 would be tuned to a first transmit IF. And for a second set of transmit channels, the IF VCO 202 would be tuned to a different IF. In this way, troublesome interference could be reduced by simply moving the position of the potential interfering frequencies caused by the IF VCO 202. This solution, however, is cumbersome in that it requires an IF VCO 202 that must be adjusted to multiple IFs. And this solution still utilizes both an RF VCO 204 and an IF VCO 202.

SUMMARY OF THE INVENTION

The present invention provides a ratiometric transmit path architecture for communication systems and related methods. This ratiometric transmit path architecture utilizes a single local oscillator signal and dividers to provide mixing signals for IF mixing circuitry and feedback mixing circuitry, thereby eliminating the need for separate IF and RF VCOs in prior solutions. As described below, other features and variations can be implemented, if desired, and related methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides a ratiometric transmit path architecture for communication systems and related methods. This ratiometric transmit path architecture utilizes a single local oscillator signal and dividers to provide mixing signals for IF mixing circuitry and feedback mixing circuitry, thereby eliminating the need for separate IF and RF VCOs in prior solutions. As discussed in more detail below, with the present invention, the separate IF VCO can be eliminated, and multiple divider circuits provide an advantageous degree of freedom in selecting values for those divider circuits.

It is noted that as used herein, a "radio frequency" or RF signal means an electrical signal conveying useful information or carrier and having a frequency from about 3 kilohertz (kHz) to thousands of gigahertz (GHz), regardless of the medium through which such signal is conveyed. Thus an RF signal may be transmitted through air, free space, coaxial cable, fiber optic cable, etc.

Figure 1A:
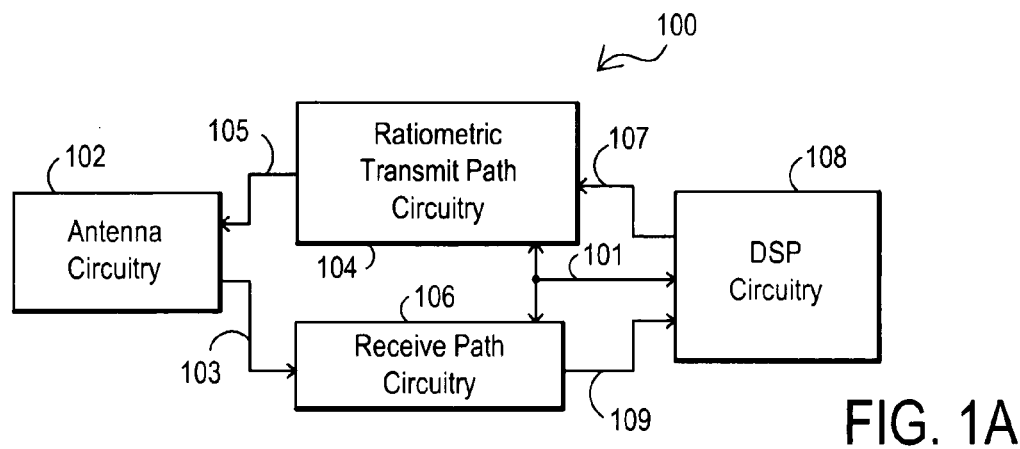
FIG. 1A is a block diagram for a communication system including transmit path circuitry and receive path circuitry.

FIG. 1A is a block diagram for a communication system 100 including transmit path circuitry 104 and receive path circuitry 106. In the wireless embodiment depicted, antenna circuitry 102 receives an RF input signal, for example, from a cellular base station. The receive path circuitry receives the signal 103 from the antenna circuitry 102 and provides an output signal 109 to DSP circuitry 108. It is noted that various architectures could be used for the receive path circuitry 106. One example architecture is a low-IF architecture where the input RF signal 103 is first converted down to low-IF (e.g., about 200 kHz) and then digitized with a band-pass analog-to-digital converter. Additional digital filtering and channel selection can then be accomplished within the DSP circuitry 108. In addition, control signals 101 can be used to help control the receive path processing. When information is transmitted, the DSP circuitry 108 provides a signal 107 to the transmit path circuitry 104. The transmit path circuitry 104 processes this information and provides output signal 105 to antenna circuitry 102. The output signal 105 is at a desired frequency within the frequency band of the communication network within which the communication system 100 is operating. A variety of architectures could be utilized for this transmit path circuitry 104. As with the receive path processing, control signals 101 can be used to help control the transmit path processing.

Figure 1B:
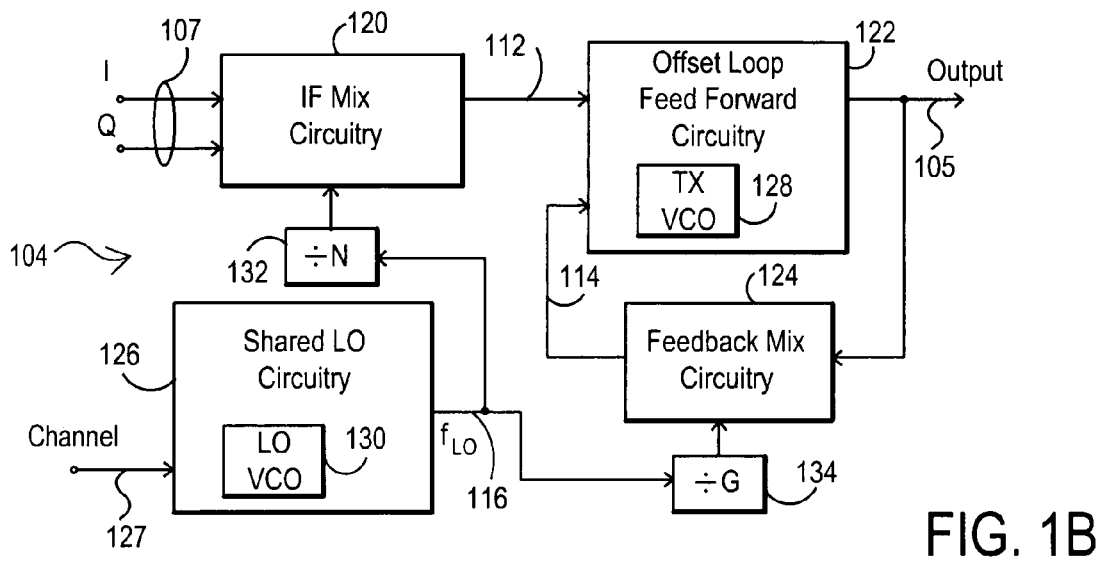
FIG. 1B is a block diagram for a ratiometric transmit path architecture.

FIG. 1B is a block diagram of an example embodiment for the ratiometric transmit path circuitry 104. Significantly, rather than having both an IF VCO 202 and an RF VCO 204, as in the traditional solution depicted in FIG. 2 (prior art), the ratiometric transmit path circuitry 104 of the present invention includes the local oscillator (LO) VCO 130. With respect to FIG. 1B, when the device is transmitting, I and Q baseband signals 107 are received from a digital signal processor (DSP) by the IF mix circuitry 120. The IF mix circuitry utilizes a mixing signal from divider (÷N) 132 to convert the I and Q signals to IF. The output 112 of IF mix circuitry 120 then goes to offset loop feed-forward circuitry 122. This offset loop feed-forward circuitry 122 will compare the phases of the signal 112 from the IF mix circuitry 120 with a signal 114 from the feedback mix circuitry 124. The offset loop feed-forward circuitry 122 will then use the phase difference between these signals to tune the TX VCO 128 to produce an output signal (OUTPUT) 105 at a desired frequency of a transmit channel within the frequency band for the communication network. The feedback mix circuitry 124 receives the output signal 105 and mixes the frequency down to a channel related frequency using a mixing signal from divider (÷G) 134. The channel related output signal 114 is then provided to the offset loop feed-forward circuitry 122. The dividers 132 and 134 receive as an input the LO signal ($f_{LO}$) 116 from shared LO circuitry 126. The shared LO circuitry 126 utilizes the channel signal (CHANNEL) 127 to tune an LO VCO 130 thereby producing the LO signal ($f_{LO}$) 116 at a desired channel related frequency. This transmit path circuitry is deemed ratiometric because the mixing signals used by IF mix circuitry 120 and the feedback mix circuitry 124 are each based upon the same starting frequency and are divided versions of that starting frequency. As such, this architecture eliminates the IF VCO 202 utilized in the prior solution of FIG. 2 (prior art).

Figure 3:
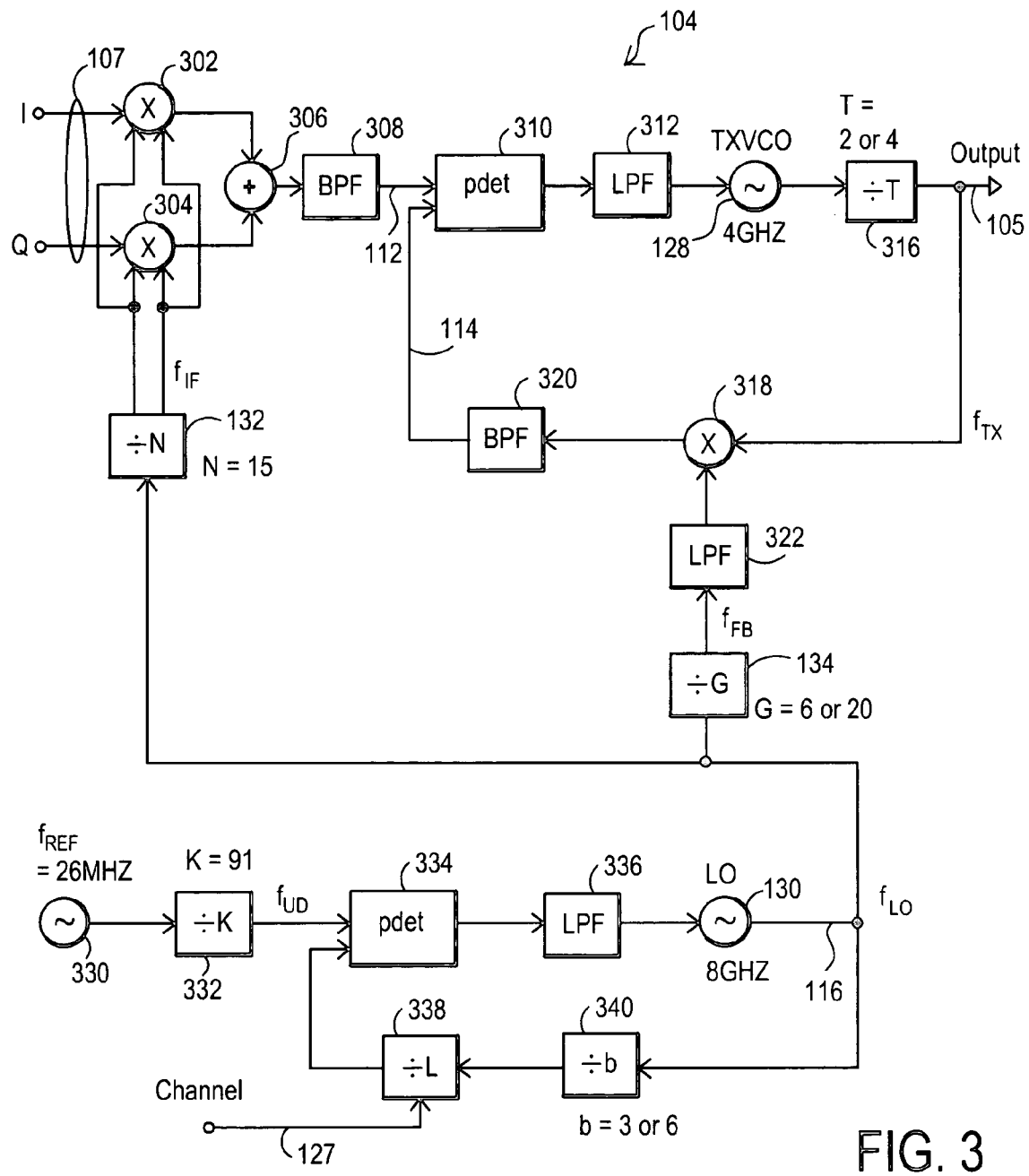
FIG. 3 is a more detailed block diagram of an example embodiment for transmit path circuitry including example numbers of the divider circuitry.

FIG. 3 is a more detailed block diagram of an example embodiment for transmit path circuitry 104 including example numbers for dividers 132 and 134. In the embodiment depicted, the LO signal ($f_{LO}$) 116 is generated by a phase lock loop (PLL). An external reference oscillator ($f_{REF}$) 330 is utilized with a frequency of 26 MHz. It is noted that typical GSM solutions today utilize either 13 MHz or 26 MHz reference clocks, but other clock frequencies could be utilized if desired. Divider (÷K) 332 receives the reference signal from reference oscillator 330 and provides an update signal ($f_{UD}$) to phase detector (PDet) 334. The output of phase detector 334 passes through low pass filter (LPF) 336 and then to the LO VCO 130. The output of LO VCO 130 is the LO signal ($f_{LO}$) 116 that is provided as an input to dividers 132 and 134. This LO signal ($f_{LO}$) 116 is passed through divider (÷b) 340 and divider (÷L) 338 before being provided as the other input to phase detector (PDet) 334.

With respect to the IF mix circuitry, the I and Q baseband signals 107 are received by mixers 302 and 304, which provide outputs to combiner 306. As depicted, the mixers 302 and 304 utilize mixing signals ($f_{IF}$) provided from divider (÷N) 132 and weighted mixing circuitry (not shown). The weighted mixing circuitry is described in more detail below. It is noted, however, that other embodiments could be utilized. For example, if traditional I and Q mixing signals were generated from divider (÷N) 132 that were 90 degrees out of phase, mixer 302 would receive an I mixing signal, mixer 304 would receive a Q mixing signal, and mixers 302 and 304 would not be required to utilize the weighted mixing circuitry set forth below. Looking back to FIG. 3, the channel signal (CHANNEL) 127 is utilized to select the value for divider (÷L) 338, which determines the frequency of the LO signal ($f_{LO}$) 116 and, thereby, ultimately the frequency of output signal 105. The LO signal ($f_{LO}$) 116 is provided to the IF mix circuitry through divider (÷N) 132 and to the feedback mix circuitry through divider (÷G) 134.

With respect to the feedback mix circuitry, the output ($f_{FB}$) from the divider (÷G) 134 is provided to mixer 318 through low pass filter (LPF) 322, which can be used to filter out undesired harmonics of the feedback signal ($f_{FB}$). Mixer 318 receives the transmit output frequency ($f_{TX}$) 105 as its other input. The output of mixer 318 is provided through band-pass filter 320 to the phase detector (PDet) 310.

With respect to the offset loop feed-forward circuitry that produces the output signal 105, the output from combiner 306 is provided through band-pass filter 308 to the phase detector (PDet) 310. The phase detector (PDet) 310 compares the phase of this input with the feedback input 114 from band-pass filter 320 and produces an output signal that is passed through low pass filter 312 to the TX VCO 128. The output of TX VCO 128 is then passed through divider (÷T) 316 to produce the output signal 105.

It is noted that the values for the dividers and other circuitry within FIG. 3 can be selected to achieve the performance parameters desired. The tables below provide example expressions representing the output frequencies for the circuitry of FIG. 3 and provide example values for the dividers and other circuitry which together provide advantageous results with respect to performance. In part, the following factors can be considered in selecting the divider values: (1) reduce spurs in undesirable frequency bands including the receive frequency bands for the communication network in which the ratiometric transmit circuitry is operating; (2) reuse the LO signal ($f_{LO}$) 116 for the receive path; (3) make the transmit path IF reasonably low; (4) make the external crystal reference frequency ($f_{XTAL}$) divided by K ($F_{XTAL}/K$) (i.e., the update frequency ($f_{UD}$) in FIG. 3) reasonably high to improve settling time; (5) have the transmit IF be relatively constant over four cellular communication network bands, namely GSM (800 and 900 MHz), DCS (1800 MHz) and PCS (1900 MHz), and (6) utilize a 13 MHz or 26 MHz external crystal reference oscillator because of current cost savings for such crystal reference oscillators.

Figure 2:
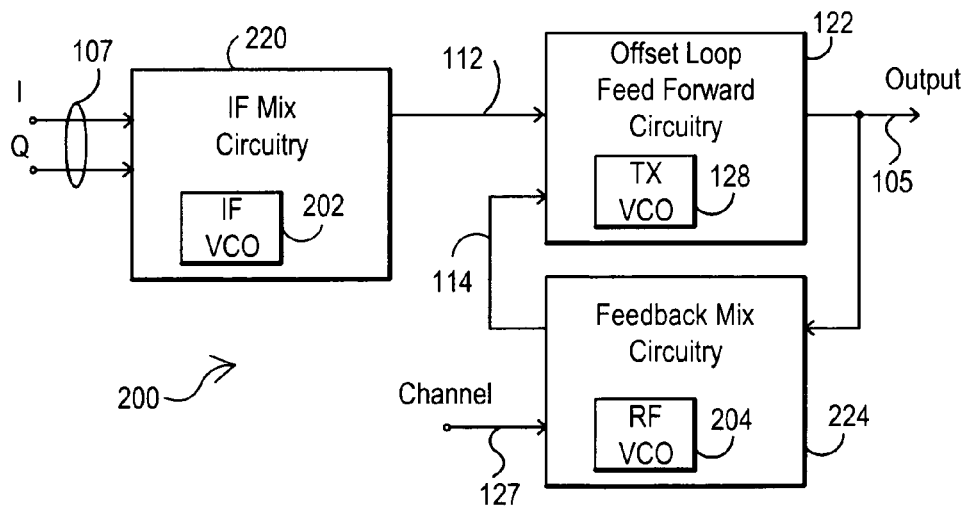
FIG. 2 (prior art) is a block diagram of an example architecture for transmit path circuitry typically implemented on multiple integrated circuits.

With respect to the divider values in FIG. 2, it is noted that the basic expression being considered in selecting values is the following:

$$f_{TX}=((G+N)/GN)(Lb/K)f_{XTAL}=PC,$$

where P represents an integer associated with the desired transmit channel, and where C represents the channel spacing. In developing solutions to this equation, positive values for the integers (G, N, L, K, b) can first be considered. Positive integer solutions correspond to low side injection. It is also noted that solutions with negative values of N are acceptable. Such solutions correspond to high side injection. It is also noted that in identifying solutions to the above equation, P can be made equal to L, and preferably P will be equal to L. TABLE 1 that follows includes example expressions that represent the ratiometric transmit architecture of FIG. 3. TABLE 2 and TABLE 3 that follow below then provide sets of example values for these expressions.

TABLE 1

EXPRESSIONS FOR FIG. 3

| Circuit | Expression for Output Frequency |
|---|---|
| Divider (÷T) 316 | $f_{TX} = f_{TXVCO}/T = f_{FB} + f_{IF}$ |
|  | $f_{TX} = (f_{LO}/G) + (f_{LO}/N) =$ |
|  | $((G + N)/GN)f_{LO}$ |
|  | $f_{TX} = ((G + N)/GN)(Lb/K)f_{XTAL}$ |
| Output of LO VCO 130 ($f_{LO}$) | $f_{LO} = (NG/(G + N))f_{TX}$ |
|  | $f_{LO} = (Lb/K)f_{XTAL}$ |
| Output of TX VCO 128 ($f_{TXVCO}$) | $f_{TXVCO} = Tf_{TX}$ |
| Divider (÷N) 132 | $f_{IF} = f_{LO}/N = (G/(G + N))f_{TX}$ |
| Divider (÷G) 134 | $f_{FB} = f_{LO}/G = (N/(G + N))f_{TX}$ |

TABLE 1-continued

EXPRESSIONS FOR FIG. 3

| Circuit | Expression for Output Frequency |
|---|---|
| Output of Reference Oscillator 330 ($f_{REF}$) | $f_{XTAL}$ = external oscillator |
| Divider (÷K) 332 | $f_{UD} = f_{XTAL}/K$ |
| Divider (÷L) 338 | $f_{338} = f_{LO}/bL$ |
| Divider (÷b) 340 | $f_{340} = f_{LO}/b$ |

TABLE 2 below provides example values that could be selected for the expressions in TABLE 1 and the dividers within the ratiometric transmit architecture of FIG. 3. In this embodiment, the divider (÷T) 316 is set to "4" and the output of TX VCO 128 is about 4 GHz; therefore, the output frequencies are in a range near 1 GHz. Thus, with respect to cellular phone communication networks, the values in TABLE 2 would be utilized, for example, with 850 MHz and 900 MHz GSM cellular phone networks.

TABLE 2

FIRST SET OF EXAMPLE VALUES FOR FIG. 3

| Circuit | Value | Expression for Output Frequency |
|---|---|---|
| Divider (÷T) 316 | 4 | $f_{TX} = ¼ (f_{TXVCO}) = f_{FB} + f_{IF}$ |
|  |  | $f_{TX} = (f_{LO}/20) + (f_{LO}/15)$ |
|  |  | $f_{TX} = (7/60)f_{LO}$ |
| Output of LO VCO 130 ($f_{LO}$) | About 8 GHz adjusted by channels | $f_{LO} = (60/7)f_{TX}$ |
|  |  | $f_{LO} = (6L/91)f_{XTAL}$ |
| Output of TX VCO 128 ($f_{TXVCO}$) | About 4 GHz adjusted by channels | $f_{TXVCO} = 4f_{TX}$ |
| Divider (÷N) 132 | 15 | $f_{IF} = f_{LO}/15 = (4/7)f_{TX}$ |
| Divider (÷G) 134 | 20 | $f_{FB} = f_{LO}/20 = (3/7)f_{TX}$ |
| Output of Reference Oscillator 330 ($f_{REF}$) | 26 MHz reference frequency | $f_{XTAL}$ = 26 MHz |
| Divider (÷K) 332 | 91 | $f_{UD} = f_{XTAL}/91$ |
| Divider (÷L) 338 | channel dependent | $f_{338} = f_{LO}/6L$ |
| Divider (÷b) 340 | 6 | $f_{340} = f_{LO}/6$ |

TABLE 3 below provides another set of example values that could be selected for the expressions in TABLE 1 and the dividers within the ratiometric transmit architecture of FIG. 3. In this embodiment, the divider (÷T) 316 is set to "2" and the output of TX VCO 128 is about 4 GHz; therefore, the output frequencies are in a range near 2 GHz. Thus, with respect to cellular phone communication networks, the values in TABLE 2 would be utilized, for example, with PCS (1900 MHz) and DCS (1800 MHz) cellular phone networks.

TABLE 3

SECOND SET OF EXAMPLE VALUES FOR FIG. 3

| Circuit | Value | Expression for Output Frequency |
|---|---|---|
| Divider (÷T) 316 | 2 | $f_{TX} = ½ (f_{TXVCO}) = f_{FB} + f_{IF}$ |
|  |  | $f_{TX} = (f_{LO}/6) + (f_{LO}/15)$ |
|  |  | $f_{TX} = (7/30)f_{LO}$ |
| Output of LO VCO 130 ($f_{LO}$) | About 8 GHz adjusted by channels | $f_{LO} = (30/7)f_{TX}$ |
|  |  | $f_{LO} = (3L/91)f_{XTAL}$ |
| Output of TX VCO 128 ($f_{TXVCO}$) | About 4 GHz adjusted by channels | $f_{TXVCO} = 2f_{TX}$ |

TABLE 3-continued

SECOND SET OF EXAMPLE VALUES FOR FIG. 3

| Circuit | Value | Expression for Output Frequency |
|---|---|---|
| Divider (÷N) 132 | 15 | $f_{IF} = f_{LO}/15 = (2/7)f_{TX}$ |
| Divider (÷G) 134 | 6 | $f_{FB} = f_{LO}/6 = (5/7)f_{TX}$ |
| Output of Reference Oscillator 330 ($f_{REF}$) | 26 MHz reference frequency | $f_{XTAL} = 26$ MHz |
| Divider (÷K) 332 | 91 | $f_{UD} = f_{XTAL}/91$ |
| Divider (÷L) 338 | channel dependent | $f_{338} = f_{LO}/3L$ |
| Divider (÷b) 340 | 3 | $f_{340} = f_{LO}/3$ |

It is noted that a single communication system can be designed for operation in multiple communication networks and their respective frequency bands. For example, the divider (÷T) 316, as well as the other dividers and circuits in FIG. 3, can be utilized to modify the output frequency such that it is within the operational band of a desired network. These values can be set, for example, through on-chip configuration registers, if desired. In addition, it is noted that the example architecture set forth in FIG. 3, as well as the expressions and values set forth in TABLE 1, TABLE 2 and TABLE 3, should be considered as examples only. Modification and variations could be made, if desired, while still taking advantage of the ratiometric transmit path architecture of the present invention.

It is further noted that the divider circuitry in FIG. 3 could be modified, if desired. For example, the dividers, such as divider (÷N) 132, could be implemented as divider/multiplier combinations. With respect to divider (÷N) 132, for example, a multiplier (×M) could be implemented, such that the circuitry provides an M/N signal operation. If such a solution were desired, the multiplier (×M) circuitry could be positioned between divider (÷N) 132 and the mixers 302 and 304, and the combined processing of the divider (÷N) 132 and the multiplier (×M) circuitry would be an M/N operation. This multiplier (×M) circuitry can be implemented as a phase locked loop (PLL) with a VCO that takes the input signal and multiplies it by an integer M. Still further, a second divider (÷N2) could be positioned between the multiplier (×M) circuitry and the mixers 302 and 304. Such a divider could be utilized, for example, where N is an odd number, and it is desired that the final divider stage be a divide-by-two or a divide-by-4. In this case, M and N2 could be selected to match so that the output becomes M/(N*N2) or simply 1/N. It is also noted that any combination of dividers and multipliers can be utilized, as desired. Thus, in implementing the divider circuitry in FIG. 3, and more specifically divider (÷N) 132, a variety of solutions can be realized including the use of multiplier circuits in combination with divider circuits.

In the above embodiments of TABLE 2 and TABLE 3, a value of 15 is selected for divider (÷N) 132. If the divider output phases are used for IF mixing signals, this value will result in IF mixing signals that differ in phase by an amount other than 90 degrees. As such, traditional quadrature mix processing alone will not achieve the desired result from mixers 302 and 304. With respect to FIGS. 4A, 4B, 5, 6A, 6B, 6C and 7, weighted mixing circuitry is described that allows for quadrature processing where the I and Q mixing signals differ by an amount other than 90 degrees.

The following equation provides a general exponential expression for up-conversion when mixing I and Q baseband signals with traditional I and Q mixing signals that are 90 degrees out of phase.

$$e^{j\omega t} \circ e^{j\theta} = \cos(\omega t)\cos(\theta) - \sin(\omega t)\sin(\theta) + j[\cos(\omega t)\sin(\theta) + \sin(\omega t)\cos(\theta)] \quad [EQ\ 1]$$

The following equation represents a trigonometric expression for this ideal mixer output.

$$I\cos(\omega t) - Q\sin(\omega t) \quad [EQ\ 2]$$

With the mixing signals of the present invention not being 90 degrees out of phase, a traditional mixer output would be represented by the following equation where 2φ represents the difference between 90 degrees and the phase difference between the I and Q mixing signals. (It is noted that in the examples below 2φ is 18 degrees.)

$$I\cos(\omega t - \phi) - Q\sin(\omega t + \phi) \quad [EQ\ 3]$$

What is desired, therefore, is to achieve a result that is similar to traditional quadrature processing even though non-traditional mixing signals of the present invention are utilized. Thus, it is desirable that the following equation be satisfied.

$$(aI+bQ)\cos(\omega t-\phi) - (bI+aQ)\sin(\omega t+\phi) = I\cos(\omega t) - Q\sin(\omega t) \quad [EQ\ 5]$$

Equation 4 can be rewritten as follows.

$$I[a\cos(\omega t-\phi) - b\sin(\omega t+\phi)] - Q[a\sin(\omega t+\phi) - b\cos(\omega t-\phi)] = I\cos(\omega t) - Q\sin(\omega t) \quad [EQ\ 4]$$

Solving for expressions in Equation 5, the following equations are reached:

$$[a\cos(\omega t-\phi) - b\sin(\omega t+\phi)] = \cos(\omega t)$$

$$a\cos(\omega t)\cos(\phi) + a\sin(\omega t)\sin(\phi)) - b\sin(\omega t)\cos(\phi) - b\cos(\omega t)\sin(\phi) = \cos(\omega t)$$

$$(a\cos\phi - b\sin\phi)\cos\omega t + (a\sin\phi - b\cos\phi)\sin\omega t = \cos\omega t \quad [EQ\ 6A];$$

and $$[a\sin(\omega t+\phi) - b\cos(\omega t-\phi)] = \sin(\omega t)$$

$$a\sin(\omega t)\cos(\phi) + a\cos(\omega t)\sin(\phi) - b\cos(\omega t)\cos(\phi) - b\sin(\omega t)\sin(\phi) = \sin(\omega t)$$

$$(a\cos\phi - b\sin\phi)\sin\omega t + (a\sin\phi - b\cos\phi)\cos\omega t = \sin\omega t \quad [EQ\ 6B]$$

Equation 6A can only be satisfied with: $(a\cos\phi - b\sin\phi) = 1$ [EQ 7A] and $(a\sin\phi - b\cos\phi) = 0$ [EQ 8A]; and Equation 6B can only be satisfied with: $(a\cos\phi - b\sin\phi) = 1$ [EQ 7B] and $(a\sin\phi - b\cos\phi) = 0$ [EQ 8B], then $$a\sin\phi = b\cos\phi$$

$$b/a = \tan\phi \quad [EQ\ 9]$$

Thus, for a particular φ, which will typically depend upon the last stage divider utilized to produce the mixing signals, values for a and b can be identified that will satisfy Equation 9 or at least approximate a solution to this equation, and integer approximations for a and b are the preferable solution to Equation 9 for purposes of implementing weighted mixing circuitry. For example, with respect to the examples below where φ is 9 degrees, the solution for Equation b/a=tan φ was approximated with a value of 19 for "a" and a value of 3 for "b." This 19/3 approximation for a/b is within about 0.5 percent of an ideal solution to Equation 9 when φ is 9 degrees. As stated below, the accuracy desired for a/b can be modified depending upon the application and precision desired.

Figure 4A:
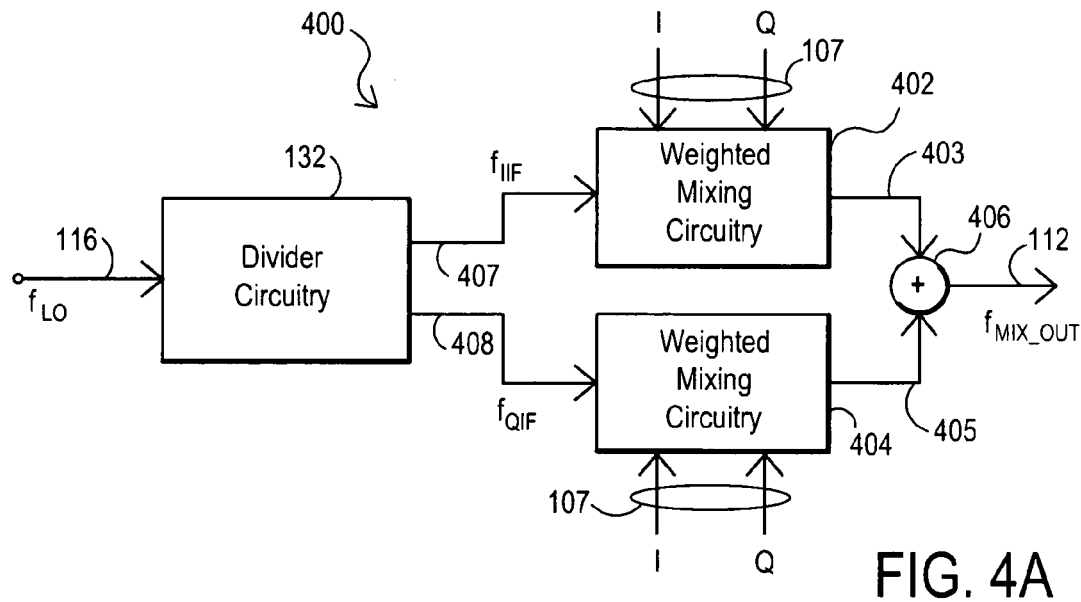
FIG. 4A is a block diagram for quadrature generation and combiner circuitry utilizing weighted mixing circuitry.
Figure 4B:
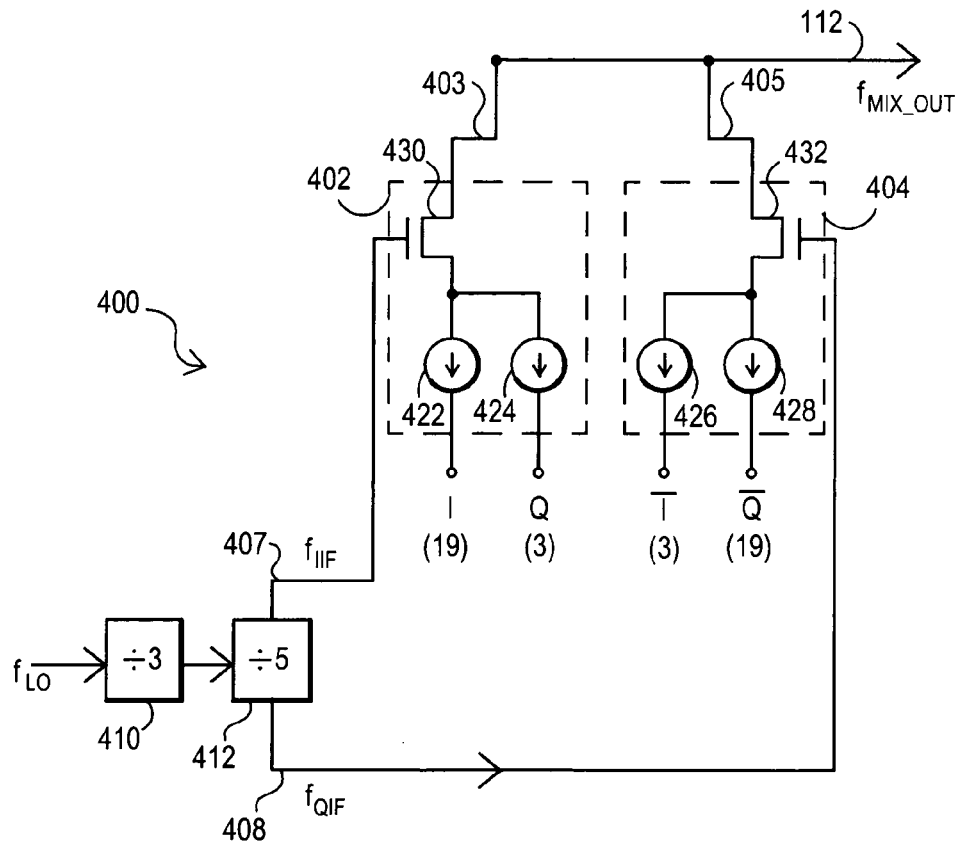
FIG. 4B is a circuit diagram for a single-ended embodiment relating to FIG. 4A for quadrature generation and combiner circuitry utilizing weighted mixing circuitry, where a final divide-by-five divider is utilized.
Figure 5:
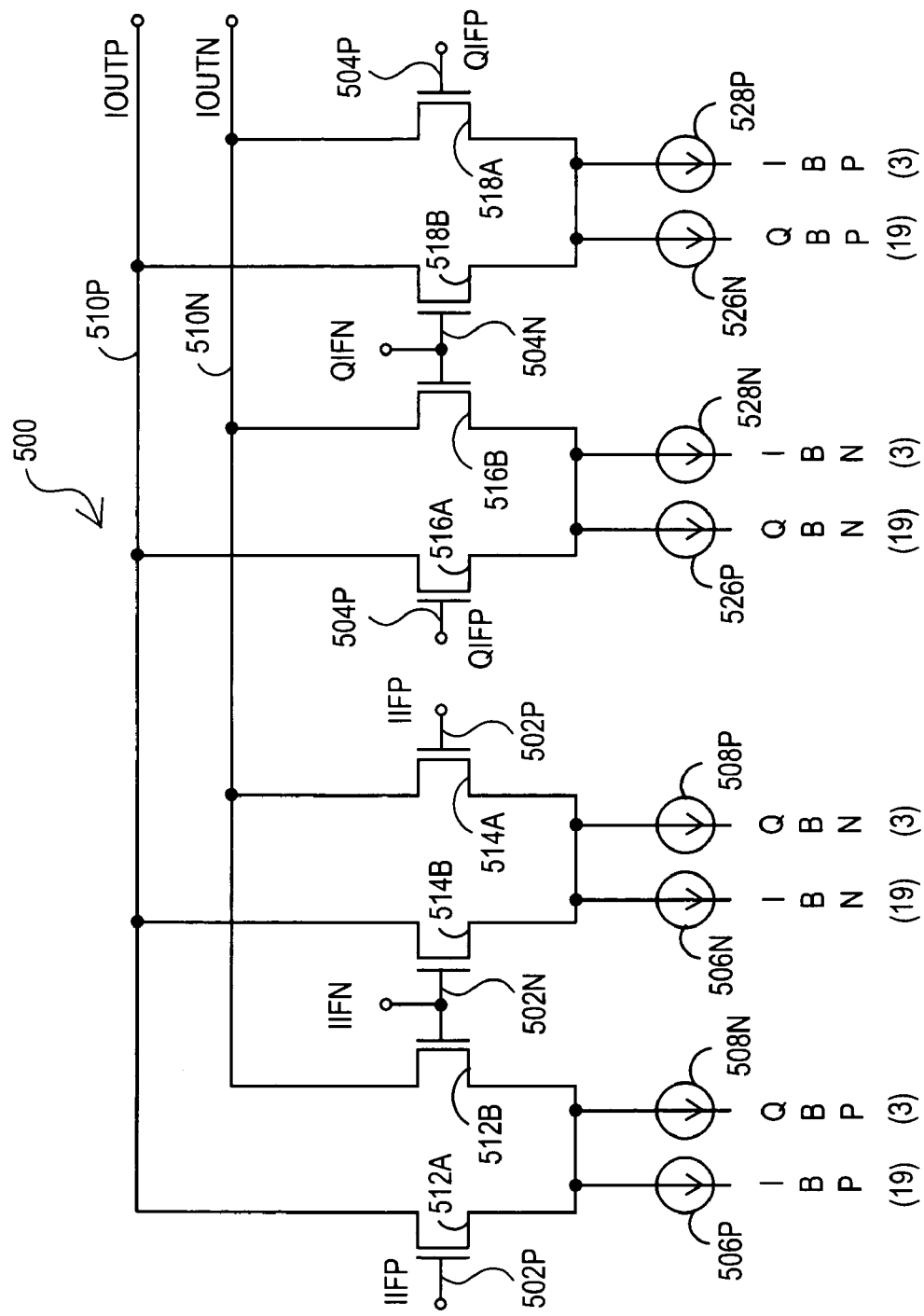
FIG. 5 is a circuit diagram for a differential embodiment relating to FIG. 4A for quadrature generation and combiner circuitry utilizing weighted mixing circuitry, where a final divide-by-five divider is utilized.

Based upon the above analysis, weighted mixing circuitry can be implemented to process signals with I and Q mixing signals that differ by an amount other than 90 degrees yet still produce a resulting signal that is the same as if true quadrature I and Q mixing signals were utilized. FIGS. 4A, 4B and 5 provide one example embodiment for up-conversion where I and Q baseband signals are weighted in the mixing circuitry. FIGS. 6A, 6B, 6C and 7 provide another example embodiment for up-conversion where I and Q mixing signals are weighted in the mixing circuitry. It is noted that other combinations could be utilized if desired and still take advantage of the weighted mixing architecture of the present invention. In this way, arbitrary divider values can be utilized in generating the mixing signals. Allowing arbitrary divider values provides a significant advantage over prior architectures where 90 degree offset I and Q mixing signals were needed for quadrature mixing.

FIG. 4A is a block diagram for quadrature generation and combiner circuitry 400 that utilizes weighted mixing circuitry 402 and 404, where divide-by-2 and divide-by-4 circuitry is not being utilized as the final stage of the divider. In particular, the LO frequency ($f_{LO}$) 116 is received by divider 132. In traditional quadrature generation circuits, a divider value of divide-by-2 or divide-by-4 are used to simplify implementations for producing output signals that are 90 degrees out of phase. For the purposes of this embodiment and the quadrature generation circuitry of the present invention, the divider 132 can be implemented by arbitrary divider circuitry that does not provide a divide-by-2 or a divide-by-4. More particularly, with respect to the present invention, a value can be utilized for divider 132 such that the real path output signal ($f_{IIF}$) 407 and the imaginary output signal ($f_{QIF}$) 408, which are utilized for mixing, are not 90 degrees out of phase. As discussed further below, weighted mixing circuitry 402 and weighted mixing circuitry 404 are utilized to process input IF mix signals that are at an arbitrary phase difference and to produce the output signals 403 and 405 that are then combined to provide the IF mix output signal ($f_{MIX\_OUT}$) 112. The weighted mixing circuitry 402 receives real path output signal ($f_{IIF}$) 407 and the baseband I and Q signals 107 as inputs, and the weighted mixing circuitry 402 outputs signal 403 to combiner 406. The weighted mixing circuitry 404 receives imaginary path output signal ($f_{QIF}$) 408 and the baseband I and Q signals 107 as inputs, and the weighted mixing circuitry 404 outputs signal 405 to combiner 406. The combiner 406 combines signals 403 and 405 to produce the combined IF mix output signal ($f_{Mix\_OUT}$) 112.

FIG. 4B is a circuit diagram for a single-ended embodiment for quadrature generation and combiner circuitry 400 utilizing weighted mixing circuitry, where a final divide-by-5 divider is utilized. In particular, the LO frequency ($f_{LO}$) 116 is first received by divider 410, which is selected to have a divide-by-3 (÷3) value, and then by divider 412, which is selected to have a divide-by-5 (÷5) value. It is noted that these two dividers 410 and 412 together represent the divider (÷N) 132 in FIG. 3 and FIG. 4A, and the two dividers 410 and 412 provide a combined divide-by-15 (÷15). Because the divider 412 is a divide-by-5 (÷5) divider, the outputs from this divider 412 are spaced at 72 degree phase intervals. In the embodiment depicted, the real path output signal ($f_{IIF}$) 407 and the imaginary path output signal ($f_{QIF}$) 408 are selected from divider (÷5) 412 to be 72 degrees apart. The weighting mixing circuitry 402 and the weighting mixing circuitry 404 in effect cause a resulting signal at the mix output node ($f_{MIX\_OUT}$) 112 that is the same as if traditional quadrature processing had been performed.

To accommodate the phase difference between the signals 407 and 408, weighted circuits are utilized. Looking to weighted mixing circuitry 402, the I signal is input to a current source 422 having a weight of 19, and the Q signal is input to a current source 424 having a weight of 3. The current sources 422 and 424 are connected to the source of transistor 430 to provide a combined current I' represented by 19I+3Q. The gate of transistor 430 receives the real path output signal ($f_{IIF}$) 407. The drain of transistor 430 provides the output signal 403 and is coupled to mix output node ($f_{MIX\_OUT}$) 112. Looking to weighted mixing circuitry 404, a negative version of the I signal is input to a current source 426 having a weight of 3, and an negative version of the Q signal is input to a current source 428 having a weight of 19. The current sources 426 and 428 are connected to the source of transistor 432 to provide a combined current −Q' represented by −19Q −3I. The gate of transistor 432 receives the imaginary path output signal ($f_{QIF}$) 408. The drain of transistor 432 provides the output signal 405 and is coupled to mix output node ($f_{MIX\_OUT}$) 112. Through the use of weighting mixing circuitry 402 and 404, the combined output signals 403 and 405 provide an output signal that is the same as if traditional quadrature processing had been performed. It is noted that the 3 and 19 weightings are generated by varying the number and size of the transistors within the respect current sources 422, 424, 426 and 428. It is also noted that the 19/3 weighting is an approximation. Depending upon the accuracy desired for the application involved, different ratios can be utilized. And even for a given desired accuracy, there may be multiple ratios that could be utilized.

It is also noted that the weightings selected are dependent upon the phase difference between the two IF input signals and can be adjusted if different divider values and phase differences are utilized. It is also noted that as described with respect to FIGS. 6A, 6B, 6C and 7, the weighted mixing circuitry could provide weighting to the IF mixing signals from divider 132, as opposed to the baseband signals. In addition, weighting could be provided to both the IF mixing signals and the baseband signals, if desired. In addition, the divider circuitry 132 could be implemented with different circuitry, if desired. The two dividers 410 and 412 depicted in FIG. 4B are intended only as an example solution.

FIG. 5 is a circuit diagram for a differential embodiment 500 for quadrature generation and combiner circuitry utilizing weighted mixing circuitry, where a final divide-by-five divider is utilized. In this embodiment, the real path IF output signal ($f_{IIF}$) 407 becomes a differential signal represented by real path positive signal (IIFP) 502P and real path negative signal (IIFN) 502N. The imaginary path output signal ($f_{QIF}$) 408 becomes a differential signal represented by imaginary path positive signal (QIFP) 504P and imaginary path negative signal (QIFN) 504N. Transistors 512A and 514A receive the real path positive signal (IIFP) 502P at their gates, and transistors 512B and 514B receive the real path negative signal (IIFN) 502N at their gates. In this embodiment, the I and Q signals also become differential signals represented by positive real baseband signal IBP, negative real baseband signal IBN, positive imaginary baseband signal QBP, and positive imaginary baseband signal QBN.

Current source 506P is connected to the sources of transistors 512A and 512B, receives the positive real baseband signal JBP as an input, and is weighted 19. Current source 508N is connected to the sources of transistors 512A and 512B, receives the positive imaginary baseband signal QBP as an input, and is weighted 3. Current source 506N is connected to the sources of transistors 514A and 514B, receives the negative real baseband signal IBN as an input, and is weighted 19. Current source 508P is connected to the sources of transistors 514A and 514B, receives the negative imaginary baseband signal QBN as an input, and is weighted 3. The drains of transistors 512A and 514B are coupled to the positive output (IOUTP) signal node 510P. And the drains of transistors 512B and 514A are coupled to the negative output (IOUTN) signal node 510N. Current source 526P is connected to the sources of transistors 516A and 516B, receives the negative imaginary baseband signal QBN as an input, and is weighted 19. Current source 528N is connected to the sources of transistors 516A and 516B, receives the negative real baseband signal IBN as an input, and is weighted 3. Current source 526N is connected to the sources of transistors 518A and 518B, receives the positive imaginary baseband signal QBP as an input, and is weighted 19. Current source 528P is connected to the sources of transistors 518A and 518B, receives the positive real baseband signal IBP as an input, and is weighted 3. The drains of transistors 516A and 518B are coupled to the positive output (IOUTP) signal node 510P. And the drains of transistors 516B and 518A are coupled to the negative output (IOUTN) signal node 510N. The output nodes 510N and 510P provide a differential mix output signal for use by other transmit path circuitry. It is again noted that the 3 and 19 weightings are generated by varying the number and size of the transistors with the respect to current sources 512A, 512B, 514A, 514B, 516A, 516B, 518A and 518B. And it is also again noted that the weightings selected are dependent upon the phase difference between the two input signals and can be adjusted if different divider values and phase differences are utilized.

The weighted mixing circuitry of the present invention, therefore, allows for non-traditional and arbitrary last-stage dividers to provide a result similar to a traditional quadrature mixing process. Rather than use last-stage divider circuitry that produces output signals that easily provide mixing signals that are differentiated by 90 degrees in phase, such as divide-by-2 or divide-by-4 dividers, other more arbitrary dividers can be utilized. In the examples depicted, a divide-by-5 block is utilized as the last stage prior to the IF mix circuitry. This divide-by-5 block, therefore, produces signals differentiated by 72 degrees in phase. It is noted that other last stage divider values could also be used with appropriate changes to the weights used within the weighted mixing circuitry 402 and 404. It is further noted that while this weighted mixing solution of the present invention suffers a signal-to-noise (SNR) penalty due to the weighted mixing, the present invention advantageously allows for the use of arbitrary divider values in quadrature generation.

Figure 6A:
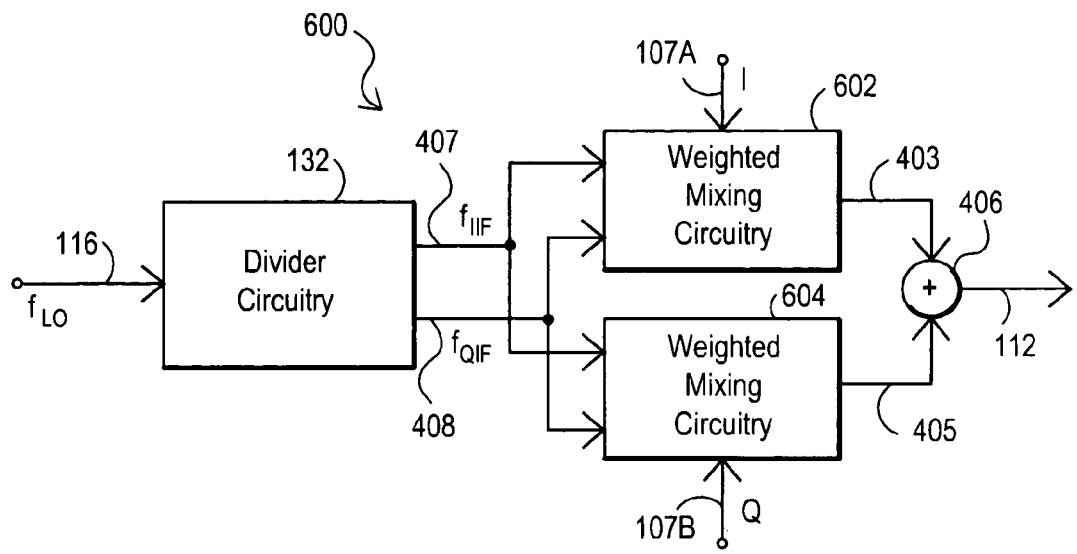
FIG. 6A is a block diagram of an alternative embodiment for quadrature generation and combiner circuitry utilizing weighted mixing circuitry.

FIG. 6A is a block diagram of an alternative embodiment for quadrature generation and combiner circuitry 600 that utilizes weighted mixing circuitry 602 and 604, where divide-by-2 and divide-by-4 circuitry is not being utilized as the final stage of the divider. In particular, the LO frequency ($f_{LO}$) 116 is received by divider 132. As stated above, in traditional quadrature generation circuits, a divider value of divide-by-2 or divide-by-4 are used to simplify implementations for producing output signals that are 90 degrees out of phase. For the purposes of this embodiment and the quadrature generation circuitry of the present invention, the divider 132 can be implemented by arbitrary divider circuitry that does not provide a divide-by-2 or a divide-by-4. More particularly, with respect to the present invention, a value can be utilized for divider 132 such that the real path output signal ($f_{IIF}$) 407 and the imaginary output signal ($f_{QIF}$) 408, which are utilized for mixing, are not 90 degrees out of phase. As discussed further below, weighted mixing circuitry 602 and weighted mixing circuitry 604 are utilized to process input IF mix signals that are at an arbitrary phase difference and to produce the output signals 403 and 405 that are then combined to provide the IF mix output signal ($f_{MIX\_OUT}$) 112. The weighted mixing circuitry 602 receives real path output signal ($f_{IIF}$) 407, imaginary path output signal ($f_{QIF}$) 408, and the baseband I signal 107A as inputs, and the weighted mixing circuitry 602 outputs signal 403 to combiner 406. The weighted mixing circuitry 604 receives real path output signal ($f_{IIF}$) 407, imaginary path output signal ($f_{QIF}$) 408 and the baseband Q signal 107B as inputs, and the weighted mixing circuitry 604 outputs signal 405 to combiner 406. The combiner 406 combines signals 403 and 405 to produce the combined IF mix output signal ($f_{MIX\_OUT}$) 112.

Figure 6B:
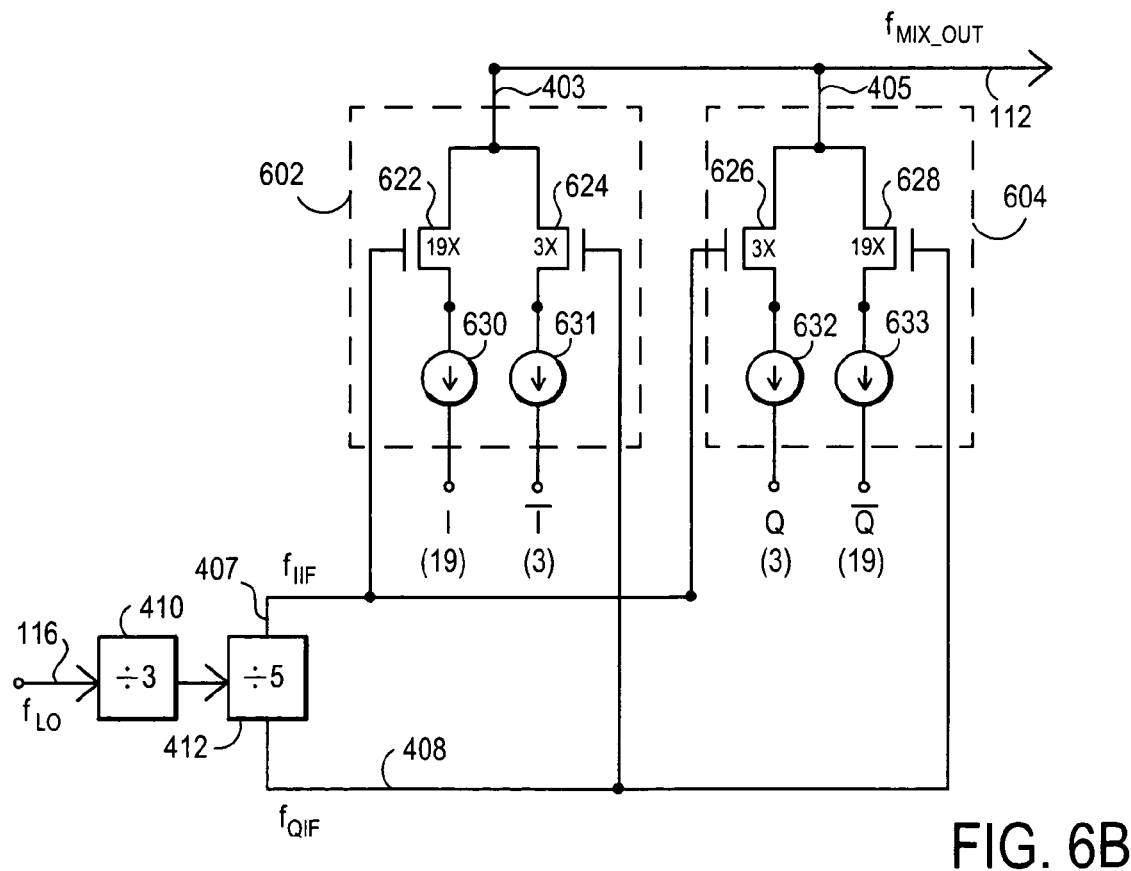
FIG. 6B is a circuit diagram for a single-ended embodiment relating to FIG. 6A for quadrature generation and combiner circuitry utilizing weighted mixing circuitry, where a final divide-by-five divider is utilized.

FIG. 6B is a circuit diagram for a single-ended embodiment for quadrature generation and combiner circuitry 600 utilizing weighted mixing circuitry, where a final divide-by-5 divider is utilized. In particular, the LO frequency ($f_{LO}$) 116 is first received by divider 410, which is selected to have a divide-by-3 (÷3) value, and then by divider 412, which is selected to have a divide-by-5 (÷5) value. It is noted that these two dividers 410 and 412 together represent the divider (÷N) 132 in FIG. 3 and FIG. 4A, and the two dividers 410 and 412 provide a combined divide-by-15 (÷15). Because the divider 412 is a divide-by-5 (5) divider, the outputs from this divider 412 are spaced at 72 degree phase intervals. In the embodiment depicted, the real path output signal ($f_{IIF}$) 407 and the imaginary path output signal ($f_{QIF}$) 408 are selected from divider (÷5) 412 to be 72 degrees apart. The weighted mixing circuitry 602 and the weighted mixing circuitry 604 in effect cause a resulting signal at the mix output node ($f_{MIX\_OUT}$) 112 that is the same as if traditional quadrature processing had been performed.

To accommodate the phase difference between the signals 407 and 408, weighted circuits are utilized. Looking to weighted mixing circuitry 602, the I signal is input to a current source 630 having a weight of 19, and a negative version of the I signal is input to current source 631 having a weight of 3. The current source 630 is connected to the source of transistor 622, and the current source 631 is connected to the source of transistor 624. Transistor 622 is weighted 19× and receives the real path output signal ($f_{IIF}$) 407 at its gate. Transistor 624 is weighted 3× and receives the imaginary path output signal ($f_{QIF}$) 408 at its gate. The drains of transistors 622 and 624 are combined to provide the output signal 403 and are coupled to mix output node ($f_{MIX\_OUT}$) 112. Looking to weighted mixing circuitry 604, the Q signal is input to a current source 632 having a weight of 3, and a negative version of the Q signal is input to a current source 633 having a weight of 19. The current source 632 is connected to the source of transistor 626, and the current source 633 is connected to the source of transistor 628. Transistor 626 is weighted 3× and receives the real path output signal ($f_{IIF}$) 407 at its gate. Transistor 628 is weighted 19× and receives the imaginary path output signal ($f_{QIF}$) 408 at its gate. The drains of transistors 626 and 628 are combined to provide the output signal 405 and are coupled to mix output node ($f_{MIX\_OUT}$) 112. As stated above, through the use of weighted mixing circuitry 602 and 604, the combined output signals 403 and 405 provide an output signal that is the same as if traditional quadrature processing had been performed. It noted that the 3× and 19× weightings are generated by varying the number and size of the transistors that make up transistors 622, 624, 626 and 628 and by varying the number and size of the transistors within the respect current sources 630, 631, 632 and 633.

It is noted that the embodiment of FIG. 6B can be modified to produce the embodiment of FIG. 4B. To make this modification, the source of transistor 622 is connected to the source of transistor 626, and transistors 622 and 626 are combined into a transistor of weight 22. The source of transistor 624 is connected to the source of transistor 628, and transistors 624 and 628 are combined into a transistor of weight 22. These modifications will yield the circuit embodiment of FIG. 4B. As indicated below, the weighted mixing circuitry of the present invention can be realized in a wide variety of implementations.

Figure 7:
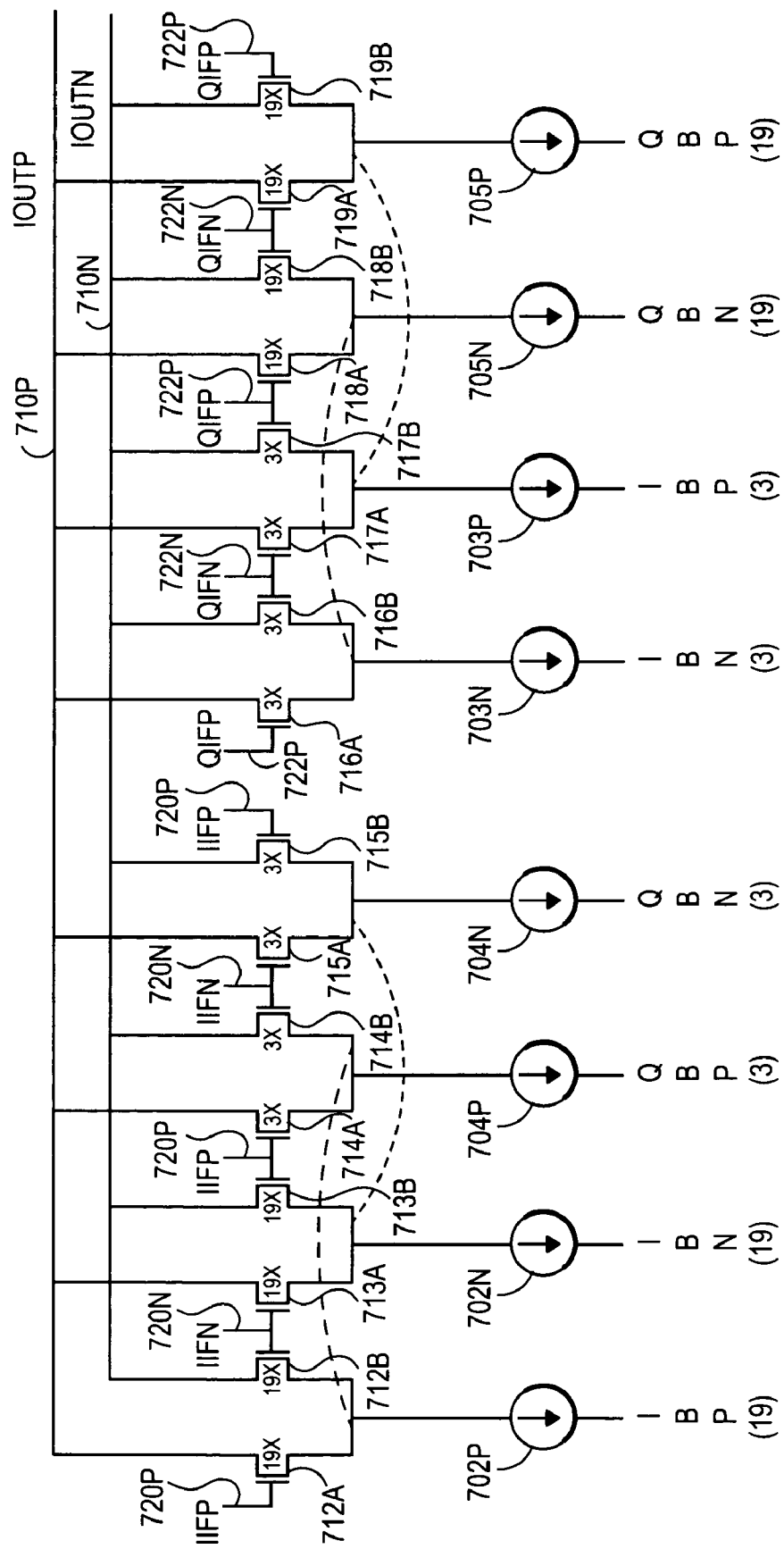
FIG. 7 is a circuit diagram for a differential embodiment relating to FIG. 6A for quadrature generation and combiner circuitry utilizing weighted mixing circuitry, where a final divide-by-five divider is utilized.

FIG. 7 is a circuit diagram relating to FIG. 6B for a differential embodiment for quadrature generation and combiner circuitry utilizing weighted mixing circuitry, where a final divide-by-five divider is utilized. In this embodiment, the real path IF output signal ($f_{IIF}$) 407 becomes a differential signal represented by real path positive signal (IIFP) 720P and real path negative signal (IIFN) 720N. The imaginary path output signal ($f_{QIF}$) 408 becomes a differential signal represented by imaginary path positive signal (QIFP) 722P and imaginary path negative signal (QIFN) 722N. In this embodiment, the I and Q signals also become differential signals represented by positive real baseband signal IBP, negative real baseband signal IBN, positive imaginary baseband signal QBP, and negative imaginary baseband signal QBN.

The sources of transistors 712A and 712B receive the positive real baseband signal IBP through current source 702P having a weight of 19. The sources of transistors 713A and 713B receive the negative real baseband signal IBN through current source 702N having a weight of 19. The sources of transistors 714A and 714B receive the positive imaginary baseband signal QBP through current source 704P having a weight of 3. The sources of transistors 715A and 715B receive the negative imaginary baseband signal QBN through current source 704N having a weight of 3. The sources of transistors 716A and 716B receive the negative real baseband signal IBN through current source 703N having a weight of 3. The sources of transistors 717A and 717B receive the positive real baseband signal IBP through current source 703P having a weight of 3. The sources of transistors 718A and 718B receive the negative imaginary baseband signal QBN through current source 705N having a weight of 19. The sources of transistors 719A and 719B receive the positive imaginary baseband signal QBP through current source 705P having a weight of 19. The gates of transistors 712A, 713B, 714A and 715B receive the real path positive signal (IIFP) 720P. The gates of transistors 716B, 717A, 718B and 719A receive the imaginary path negative signal (QIFN) 722N. The gates of transistors 716A, 717B, 718A and 719B receive the imaginary path positive signal (QIFP) 722P. The gates of transistors 712B, 713A, 714B and 715A receive the real path negative signal (IIFN) 720N. Transistors 712A, 712B, 713A, 713B, 718A, 718B, 719A and 719B are weighted 19×Transistors 714A, 714B, 715A, 715B, 716A, 716B, 717A and 717B are weighted 3×. The drains of transistors 712A, 713A, 714A, 715A, 716A, 717A, 718A and 719A are coupled to the positive output path IOUTP 710P. The drains of transistors 712B, 713B, 714B, 715B, 716B, 717B, 718B and 719B are coupled to the negative output path IOUTN 710N. The output nodes 710N and 710P provide a differential mix output signal for use by other transmit path circuitry.

As stated above, the weighted mixing circuitry of the present invention, therefore, allows for non-traditional and arbitrary last-stage dividers to be utilized to provide a result similar to a traditional quadrature mixing process. Rather than use last-stage divider circuitry that produces output signals that easily provide mixing signals that are differentiated by 90 degrees in phase, such as divide-by-2 or divide-by-4 dividers, other more arbitrary dividers can be utilized. In the examples depicted, a divide-by-5 block is utilized as the last stage prior to the IF mix circuitry. This divide-by-5 block, therefore, produces signals differentiated by 72 degrees in phase. It is noted that other last stage divider values could also be used with appropriate changes to the weights used within the weighted mixing circuitry 602 and 604. It is further noted that while this weighted mixing solution of the present invention suffers a signal-to-noise (SNR) penalty due to the weighted mixing, the present invention advantageously allows for the use of arbitrary divider values in quadrature generation.

It is noted that the embodiment of FIG. 7 can be modified to produce the embodiment of FIG. 5. To make this modification, as represented by the dotted lines, the sources of transistors 712A, 712B, 714A and 714B are connected together; the sources of transistors 713A, 713B, 715A and 715B are connected together; the sources of transistors 716A, 716B, 718A and 718B are connected together; and the sources of transistors 717A, 717B, 719A and 719B are connected together. In addition, the transistors 712A and 714A are combined into a transistor of weight 22; the transistors 712B and 714B are combined into a transistor of weight 22; the transistors 713A and 715A are combined into a transistor of weight 22; the transistors 713B and 715B are combined into a transistor of weight 22; the transistors 716A and 718A are combined into a transistor of weight 22; the transistors 716B and 718B are combined into a transistor of weight 22; the transistors 717A and 719A are combined into a transistor of weight 22; and the transistors 717B and 719B are combined into a transistor of weight 22. These modifications will yield the circuit embodiment of FIG. 5. As indicated below, the weighted mixing circuitry of the present invention can be realized in a wide variety of implementations.

In addition, it is noted that FIGS. 4A, 4B, 5, 6A, 6B and 7 provide example embodiments for implementing the weighted mixing circuitry of the present invention and other implementations could be utilized, if desired. For example, with respect to the differential embodiments of FIGS. 5 and 7, other differential implementations could be utilized that are based upon the single ended implementations of FIGS. 4B and 6B. To get from the single ended implementations to the differential implementations, for example, alternate designs could be provided by making this transition in different ways, such as by (1) keeping all nodes the same, (2) inverting the gate drive signals and drain outputs for the transistors, (3) inverting the source drive signals and the drain outputs for the transistors, and (4) inverting the source drive signals and inverting the gate drive signals. In short, the weighted mixing circuitry of the present invention can be implemented in a wide variety ways, including both single ended and differential solutions.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. Ratiometric transmit path circuitry for a communication system operable in at least two frequency bands comprising:
    mixing circuitry configured to convert I and Q baseband input signals to a combined output signal at an intermediate frequency (IF);
    transmit circuitry coupled to receive the combined IF signal from the mixing circuitry and to output a transmit signal at a desired output frequency within at least two frequency bands, the transmit circuitry comprising offset phase lock loop (PLL) circuitry comprising:
        a phase detector coupled to receive the combined IF signal and to receive a feedback input signal;
        a transmit voltage controlled oscillator (VCO) coupled to receive the output of the phase detector, the transmit VCO having an output frequency above the desired output frequency;
        transmit divider circuitry coupled to receive the output of the transmit VCO and to output the transmit signal at the desired output frequency, the divider value for the transmit divider circuitry being selectable between two divider values to provide the transmit signal at the desired output frequency such that a first divider value is used for a first frequency band and a second divider value is used for a second frequency band; and
        transmit mixer circuitry coupled to receive the transmit signal and a mixing signal as an inputs, the output of the transmit mixer circuitry being coupled to provide the feedback input signal to the phase detector;
    oscillator circuitry configured to output a local oscillator (LO) signal;
    first divider circuitry coupled to receive the LO signal and to output an IF mixing signal to the mixing circuitry, the divider value for the first divider circuitry being a single divider value such that the single divider value is used for the first frequency band and the second frequency band; and
    second divider circuitry coupled to receive the LO signal and to output the mixing signal to the transmit circuitry, the divider value for the second divider circuitry being selectable between to divider values such that a first divider value is used for the first frequency band and a second divider value being used for the second frequency band.

2. The ratiometric transmit path circuitry of claim 1, wherein for the first frequency band, the transmit divider circuitry is configured to provide a divide-by-4, the first divider circuitry is configured to provide a divide-by-15 and the second divider circuitry is configured to provide a divide-by-20.

3. The ratiometric transmit path circuitry of claim 1, wherein for the second frequency band, the transmit divider circuitry is configured to provide a divide-by-2, the first divider circuitry is configured to provide a divide-by-15 and the second divider is configured to provide a divide-by-6.

4. The ratiometric transmit path circuitry of claim 1, wherein the output of the first divider is configured to be 2/7 of the output of the transmit circuitry, and the output of the second divider is configured to be 5/7 of the output of the transmit circuitry.

5. The ratiometric transmit path circuitry of claim 4, wherein circuitry is configured for a PCS or DCS cellular phone communications network, or a combination thereof.

6. The ratiometric transmit path circuitry of claim 1, wherein the output of the first divider is configured to be 4/7 of the output of the transmit circuitry, and the output of the second divider is configured to be 3/7 of the output of the transmit circuitry.

7. The ratiometric transmit path circuitry of claim 6, wherein the output of the transmit circuitry is configured for a GSM cellular phone communications network.

8. The ratiometric transmit path circuitry of claim 1, wherein the oscillator circuitry comprises phase lock loop (PLL) circuitry including a phase detector.

9. The ratiometric transmit path circuitry of claim 8, wherein the phase detector receives a first input signal provided by a reference frequency passed through third divider circuitry and receives a second input signal provided by an output feedback signal passed through fourth divider circuitry.

10. The ratiometric transmit path circuitry of claim 9, wherein the reference frequency is 26 MHz and wherein the third divider circuitry is configured to provide a divide-by-91.

11. The ratiometric transmit path circuitry of claim 10, wherein the fourth divider circuitry comprises divider circuitry configured to allow channel selection and divider circuitry configured to allow selection among multiple communication networks.

12. The ratiometric transmit path circuitry of claim 9, wherein the fourth divider circuitry comprises divider circuitry configured to allow channel selection and divider circuitry configured to allow selection among multiple communication networks.

13. The ratiometric transmit path circuitry of claim 1, wherein the first divider circuitry or the second divider circuitry or both comprises a combination of at least one multiplier circuit (×M) and at least one divider circuit (÷N) such that an M/N operation is performed.

14. A method for transmitting signals for a communication system operable in at least two frequency bands, comprising:
    mixing I and Q baseband input signals with an intermediate frequency (IF) mixing signal to generate a combined output signal at an IF;
    converting the combined IF signal to a transmit signal at a desired output frequency utilizing a second mixing signal and an offset PLL, the converting step comprising:
        generating a phase error signal by comparing the combined IF signal with a feedback signal;
        controlling a transmit voltage controlled oscillator (VCO) with the phase error signal;
        selecting a divider value for transmit divider circuitry such that a first divider value is used for a first frequency band and a second divider value is used for a second frequency band;
        utilizing the transmit divider circuitry to divide the output of the transmit VCO to output the transmit signal at the desired output frequency; and mixing the transmit signal with the second mixing signal to generate the feedback signal;
generating a local oscillator (LO) signal;
utilizing a single divider value for first divider circuitry to generate a divided versions of the LO signal to provide the IF mixing signal;
utilizing a selectable divider value for second divider circuitry such that a first divider value is used for a first frequency band and a second divider value is used for a second frequency band; and
utilizing the second divider circuitry to generate a divided version of the LO signal to provide the second mixing signal.

15. The method of claim 14, wherein the output of the transmit signal is configured for a GSM, PCS or DCS cellular phone communications network, or a combination thereof.

16. The method of claim 14, wherein the generating step comprises utilizing phase lock loop (PLL) circuitry to generate the LO signal.

17. The method of claim 16, further comprising selecting a channel by adjusting the output of the PLL circuitry.

18. The method of claim 17, further comprising selecting among multiple communication networks by adjusting the output of the PLL circuitry.

19. The method of claim 16, further comprising generating a reference frequency for the PLL circuitry by passing a 26 MHz signal through divide-by-91 divider circuitry.

20. The method of claim 14, further comprising for the first frequency band, utilizing a divide-by-4 for the transmit divider circuitry, a divide-by-15 for the first divider circuitry and a divide-by-20 for the second divider circuitry.

21. The method of claim 14, further comprising for the first frequency band, utilizing a divide-by-4 for the transmit divider circuitry, a divide-by-15 for the first divider circuitry and a divide-by-6 for the second divider circuitry.

22. The method of claim 14, further comprising generating at least one divided version of the LO signal at least one multiplier circuit (×M) and at least one divider circuit (÷N) to perform an M/N operation.

* * * * *

UNITED STATES PATENT AND TRADEMARK OFFICE
CERTIFICATE OF CORRECTION

PATENT NO. : 7,376,396 B2
APPLICATION NO. : 11/096133
DATED : May 20, 2008
INVENTOR(S) : Welland et al.

Page 1 of 1

It is certified that error appears in the above-identified patent and that said Letters Patent is hereby corrected as shown below:

In claim 1, column 15, line 55, delete "to," and insert --two--.

In claim 5, column 16, line 9, after "wherein," insert --the output of the transmit--.

In claim 14, column 17, line 5, delete "versions," and insert --version--.

Signed and Sealed this

Twenty-second Day of July, 2008

JON W. DUDAS
*Director of the United States Patent and Trademark Office*